United States Patent [19]
Rau

[11] Patent Number: 5,343,468
[45] Date of Patent: Aug. 30, 1994

[54] METHOD AND CIRCUIT ARRANGEMENT FOR TRANSMITTING A CONTINUOUS BIT STREAM UPON INVOLVEMENT OF AN ATM NETWORK

[75] Inventor: Peter Rau, Munich, Fed. Rep. of Germany

[73] Assignee: Siemens Aktiengesellschaft, Munich, Fed. Rep. of Germany

[21] Appl. No.: 82,376

[22] Filed: Jun. 28, 1993

[30] Foreign Application Priority Data

Jun. 30, 1992 [DE] Fed. Rep. of Germany ....... 4221477

[51] Int. Cl.$^5$ .................................. H04L 12/56
[52] U.S. Cl. .......................... 370/60; 370/84; 370/94.1
[58] Field of Search ............ 370/56, 60, 60.1, 84, 370/94.1, 94.2

[56] References Cited

U.S. PATENT DOCUMENTS

| 5,128,929 | 7/1992 | Kobayashi | 370/60 |
| 5,144,297 | 9/1992 | Ohara | 370/60 |
| 5,153,578 | 10/1992 | Izawa et al. | 370/60.1 |
| 5,202,886 | 4/1993 | Rossi et al. | 370/84 |

Primary Examiner—Benedict V. Safourek
Attorney, Agent, or Firm—Hill, Steadman & Simpson

[57] ABSTRACT

In a method and circuit arrangement for transmitting a continuous bit stream upon involvement of an ATM network, the continuous bit stream appears with a transmission bit rate that is greater than a transmission bit rate respectively defined for inputs (E1, . . . ,En) and outputs (A1, . . . ,An) of the ATM network (KE). This continuous bit stream is subdivided into signal sections that, with respect to their bit plurality plus a defined plurality of information bits, correspond to the plurality of bits transmittable in the information part of a message cell as useful signals. In successive control cycles, a plurality of signal sections corresponding in number to the bit rate ratio of the appertaining transmission bit rates are respectively inserted into the information part of a message cell with a signal section sequence number that continuously varies attached to them. The message cells are then transmitted via different transmission paths within the ATM network and are subsequently joined again to form a continuous bit stream according to the measure of the signal section sequence numbers contained in the message cells.

6 Claims, 4 Drawing Sheets

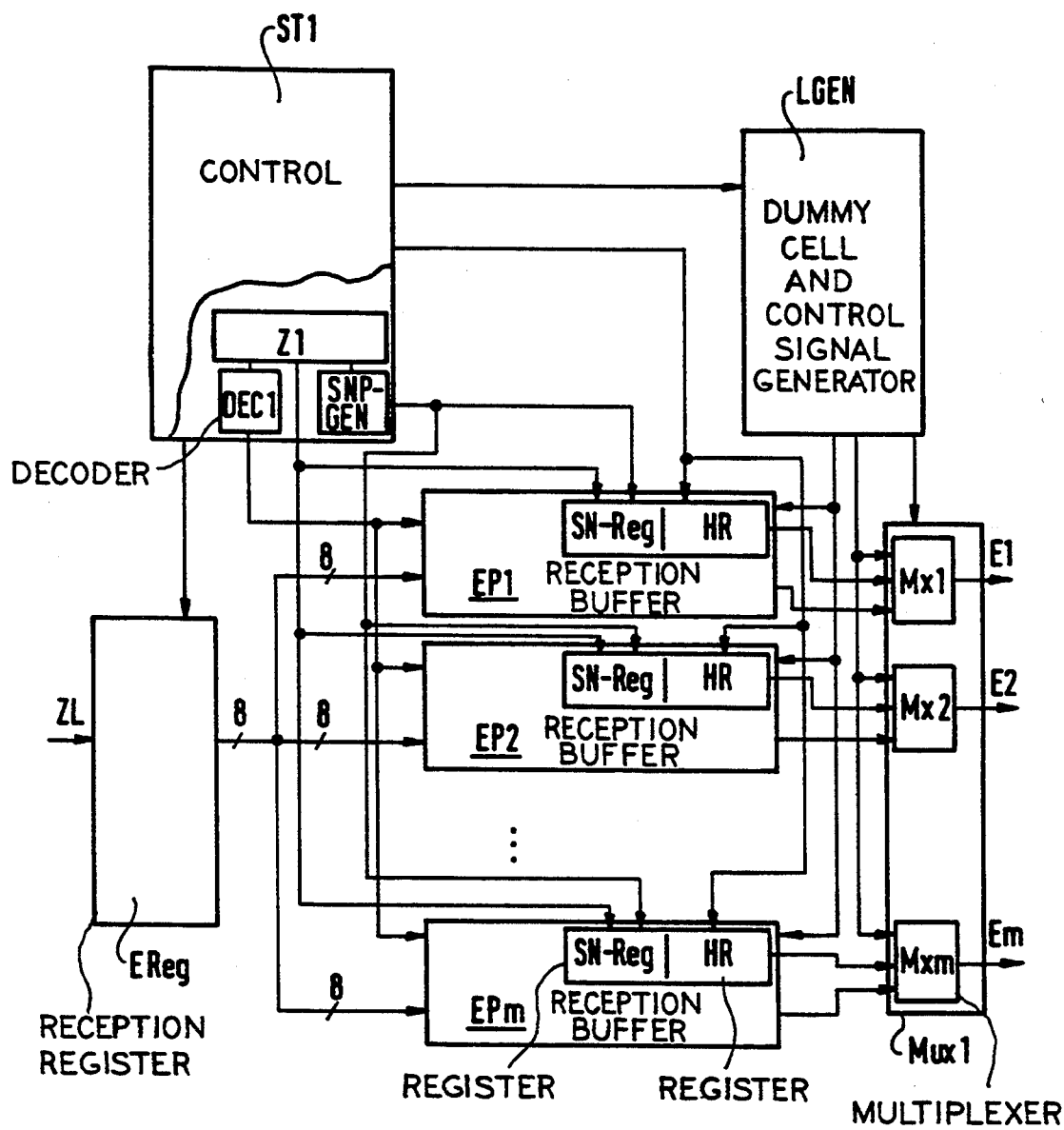

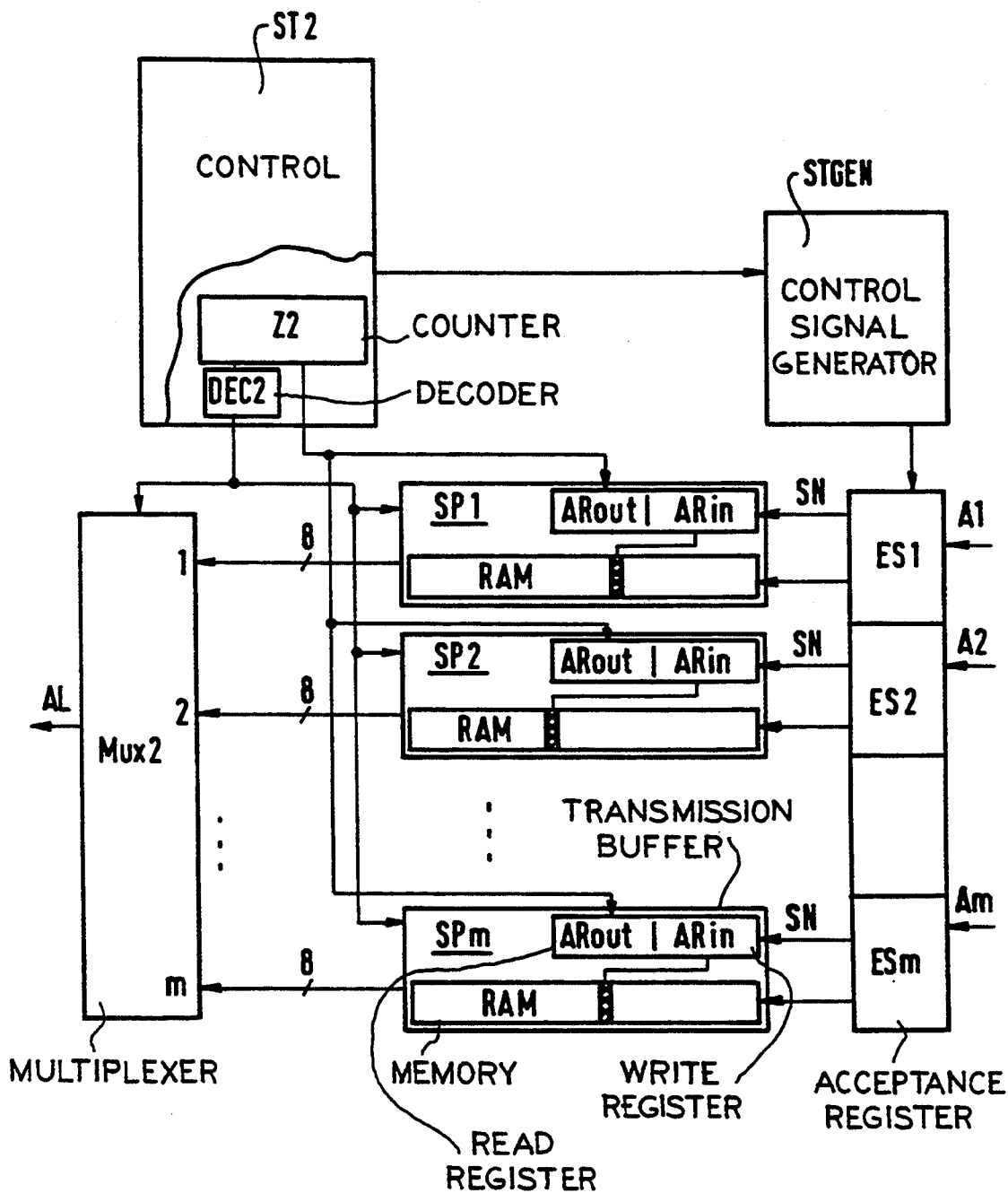

METHOD AND CIRCUIT ARRANGEMENT FOR TRANSMITTING A CONTINUOUS BIT STREAM UPON INVOLVEMENT OF AN ATM NETWORK

BACKGROUND OF THE INVENTION

The present invention is directed to a method and circuit arrangement for transmitting a continuous bit stream upon involvement of an ATM network.

A method for forwarding message cells, each of which having a cell header identifying the respective virtual connection and being transmitted on offering trunks during the course of virtual connections according to an asynchronous transfer method via cell switching equipment that has at least two redundant switching matrices to serving trunks connected thereto, is described in European Patent Application 89 10 3798. In this method, a message cell group having a plurality of identical message cells corresponding in number to the plurality of redundant switching matrices is formed by duplication for each of the message cells transmitted on one of the offering trunks during the course of a virtual connection. An identical auxiliary identifier that changes for successive message cell groups and has the form of a continuously assigned message cell sequence number is thereby entered in the cell header of each of the message cells of a message cell group. Subsequently, the message cells of a message cell group are separately transmitted via the redundant switching matrices in the direction of the relevant serving trunk for the respective virtual connection. Finally, after such a transmission over the redundant switching matrices only one of the message cells belonging to a message cell group is forwarded to the serving trunk. This message cell is forwarded on the basis of the auxiliary identifier respectively attached to the message cells.

Over and above this, a method for switching message cells of a transmission system that transports a message cell stream according to an asynchronous transfer method via a switching network constructed with modules is described in European Patent Application 91 10 7434 (corresponding to U.S. Ser. No. 880,188 filed May 5, 1992, now allowed, and hereby incorporated by reference). The transport bit rate of the transmission system amounts to a multiple of the transmission bit rate of the switching elements of the modules. Message cells to be switched are thereby distributed onto one of the switching network inputs corresponding in number to the multiple, being respectively distributed upon attachment of information. This information references all those modules over which the respective message cells are to be through-connected to an output of the switching network. The message cells transmitted to various outputs are then again combined to form a message cell stream. What is thereby provided, among other things, is that a cyclically continuous sequence number is attached in call-associated fashion to the message cells before the through-connection with the switching network, the sequence of the message cells for every connection being assured with reference to this sequence number in the combining to form the message cell stream. It is also provided that the message cells are cyclically distributed onto the switching network inputs.

SUMMARY OF THE INVENTION

It is an object of the present invention to provide a method and circuit arrangement of the type initially cited for transmitting a continuous bit stream upon involvement of at least one ATM communication equipment functioning according to an asynchronous transfer principle with a low control outlay.

In general terms the method of the present invention is for transmitting message signals that appear in a continuous bit stream with a first transmission bit rate via an ATM network that operates according to an asynchronous transfer method and that has a plurality of inputs and outputs and at least one ATM communication equipment. The inputs and the outputs are designed for the reception or, respectively, transmission of message signals in the form of message cells that have a cell header and an information part and that have a second transmission bit rate, which is less than the first transmission bit rate. The message signals appearing in the continuous bit stream are subdivided into successive signal sections whose respective bit plurality is uniformly set such that this, plus a defined plurality of information bits, corresponds to the plurality of bits that can be transmitted as useful signals in the information part of a message cell. A plurality of signal sections respectively corresponding to the bit ratio of the first transmission bit rate to the second transmission bit rate are respectively inserted into the information part of a message cell and a continuously varying signal section sequence number is thereby entered into the respective information parts as information bits. Message cells appearing during the course of a control cycle are successively distributed onto a plurality of inputs of the ATM network that corresponds in number to the appertaining bit rate ratio and are transmitted via the appertaining inputs to outputs of the ATM network allocated thereto. Message cells appearing at the appertaining outputs have the signal section respectively contained therein, as well as, the signal section sequence number belonging thereto removed from them. Subsequently, the individual signal sections are reattached to one another to form a continuous bit stream according to the measure of the signal section sequence numbers.

The present invention is also a circuit arrangement for the implementation of the above-described method wherein an ATM network has at least one ATM communication equipment, which is connected to at least one offering trunk via which message signals in a continuous bit stream can be transmitted with a first transmission bit rate and to at least one serving trunk for the forwarding of message signals in a continuous bit stream. The ATM communication equipment has internal inputs and outputs available to it which are designed for the reception or, respectively, transmission of message signals in the form of message cells that have a cell header and an information part and that have a second transmission bit rate, which is less than the first transmission bit rate. At least one first interface arrangement is provided which is connected to the respective offering trunk and to a plurality of internal inputs of the ATM network corresponding in number to a bit rate ratio of the first transmission bit rate to the second transmission bit rate. The first interface arrangement has a distributor means that is connected to the respective offering trunk and that subdivides the supplied, continuous bit stream into successive signal sections whose respective bit plurality is uniformly defined. This plus a defined plurality of information bits corresponds to the plurality of the bits transmittable in the information part of a message cell as useful signals. In successive control cycles, the distributor means distributes a plurality of signal sections corresponding in number to the appertaining bit rate ratio in a defined sequence to packeting devices connected to the appertaining internal inputs of the ATM network. During the course of the respective control cycle, the packeting devices respectively insert the signal section that has just been supplied together with information bits in the form of a signal section sequence number that is uniform for all packeting devices and only varies from control cycle to control cycle into a message cell and supply this message cell to the allocated, internal input of the ATM network. At least one second interface arrangement is provided which is connected to the respective serving trunk and to a plurality of internal outputs of the ATM network that corresponds in number to the appertaining bit rate ratio and is allocated to the plurality of internal inputs of the ATM network. The second interface arrangement has depacketing devices that are connected to the internal outputs, that respectively take the signal section contained in the message cells appearing at the appertaining internal output as well as the signal section sequence number from the message cell appearing at the appertaining internal output and, according to the measure of the signal section sequence number, first intermediately store the respective signal section in an appertaining random access memory under a write address corresponding to the signal section sequence number. The random access memories that belong to the depacketing devices can be respectively driven in successive control cycles according to the measure of a uniform read address that only changes from control cycle to control cycle such that these random access memories successively offer the respective signal section just now stored under the read address in a sequence corresponding to the defined sequence. The offered signal sections are joined with one another to form a continuous bit stream in a multiplexing means that follows the depacketing devices and that is connected to the respective serving trunk.

The method of the present invention thereby produces the advantage that a continuous bit stream, i.e. a bit stream without cell structure transmitted, for example, according to a synchronous transfer principle, is transmitted signal section by signal section in the information parts of message cells via a plurality of inputs of the ATM communication equipment. Auxiliary information in the form of signal section sequence numbers required for the recovery of a continuous bit stream is exclusively transmitted in the information parts of message cells, i.e. in the actual user field of the message cells. Message cells containing signal sections of the continuous bit stream thus have no modifications in view of their respective cell header in comparison to the cell headers of the remaining message cells transmitted via the ATM communication equipment. As a result no additional control outlay within the ATM communication equipment is required for the transmission of the message cells provided for the original, continuous bit stream. After a transmission of the message cells containing signal sections, on the contrary, a recovery of a continuous bit stream having a signal section sequence that corresponds to the signal section sequence of the original, continuous bit stream ensues exclusively on the user level, in that the signal section sequence numbers transmitted in the information fields of the message cells are interpreted.

In an advantageous development of the method of the present invention a uniform signal section sequence number that only changes from control cycle to control cycle is entered into the information part of the message cell formed during the course of a control cycle as respective information bits and the message cells are successively distributed in a defined sequence onto the appertaining inputs of the ATM network. The signal sections taken from the message cells appearing at the appertaining outputs of the ATM network are joined to one another in a sequence corresponding to the defined sequence and are formed into a continuous bit stream according to the measure of the signal section sequence numbers.

The advantage of this development is that the same signal section sequence numbers are used for the transmission of message cells via the individual inputs of the ATM communication equipment, so that a relatively slight number of bit places can be reserved for these signal section sequence numbers in the information fields of the message cells.

In a further advantageous development of the method of the present invention a check of a faultless transmission is respectively entered into the information part of the message cells as information bits in addition to a signal section sequence number.

The advantage of this development is that check information attached to the signal section sequence numbers make it possible in a simple way to identify transmission errors within the ATM communication equipment.

The advantage of the above-described circuit arrangement is in the low circuit-oriented outlay for the transmission of a continuous bit stream via an ATM communication equipment and for the recovery of a continuous bit stream that is sequentially correct in view of the individual bits, taking different transit times of message cells within the ATM communication equipment into consideration.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 5 shows a possible structure of the interface equipment that is schematically shown in FIG. 1; and FIG. 6 shows a possible structure of an evaluation means that is schematically shown in FIG. 1.

DESCRIPTION OF THE PREFERRED EMBODIMENT

Figure 1:
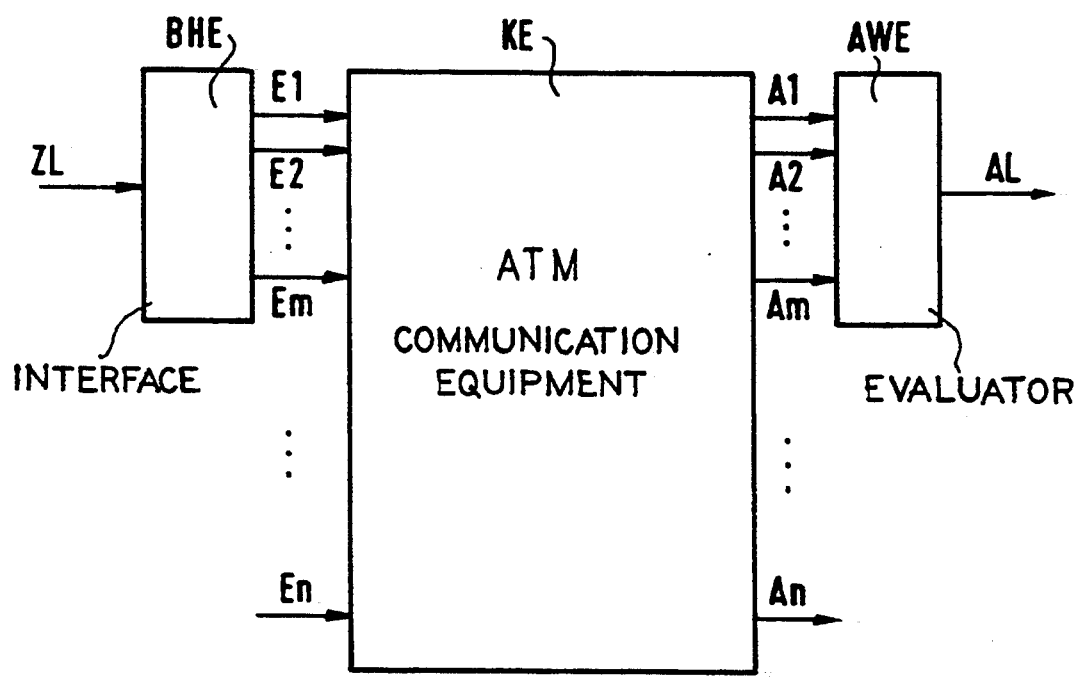
FIG. 1 is a block diagram of ATM communication equipment wherein the present invention is utilized.

FIG. 1 shows ATM communication equipment KE operating according to an asynchronous transfer mode, for example in the form of switching equipment that has a plurality of inputs E1 through Em as well as a plurality of outputs A1 through An. The inputs and outputs are thereby respectively designed for the reception or, respectively, transmission of message cells having a cell header and an information part with a defined transmission bit rate. A handling or interface means BHE that has its input side in communication with an offering trunk ZL is connected at least to a defined plurality of inputs E1 through Em. A transmission of a continuous bit stream without cell structure having a transmission bit rate that is higher in comparison to the bit rate defined for the inputs and outputs ensues via this offering trunk. The plurality of inputs E1 through Em connected to the handling means BHE thereby corresponds to the bit rate ratio of the transmission bit rate defined for the offering trunk relative to the transmission bit rate defined for the inputs and outputs of the ATM communication equipment.

In addition, an evaluation means AWE that has its output side connected to a serving trunk AL is connected to at least a defined plurality of outputs A1 through Am, which can be assumed to be allocated to the aforementioned inputs E1 through Em. This serving trunk is provided for the transmission of a continuous bit stream that corresponds to the aforementioned, continuous bit stream appearing on the offering trunk ZL. The plurality of outputs A1 through Am thereby again corresponds to the bit rate ratio of the transmission bit rate defined for the serving trunk relative to the transmission bit rate defined for these outputs.

Figure 2:
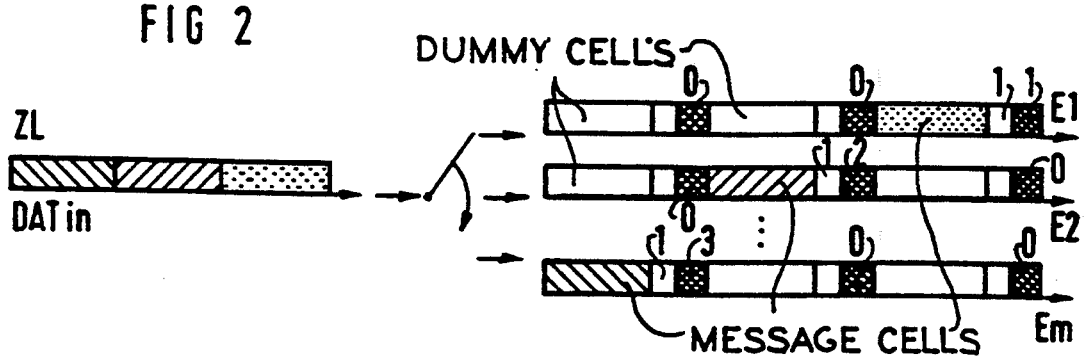
FIGS. 2 through 4 each respectively show cells used in the method of the present invention.

As shown in FIG. 2, the continuous bit stream DATin appearing on the offering trunk ZL is first subdivided into successive signal sections. These are then inserted into message cells that are cyclically distributed onto the inputs E1 through Em shown in FIG. 1 for a transmission via the ATM communication equipment KE. What are referred to as dummy cells are thereby inserted between the message cells supplied to one and the same input.

Figure 3:
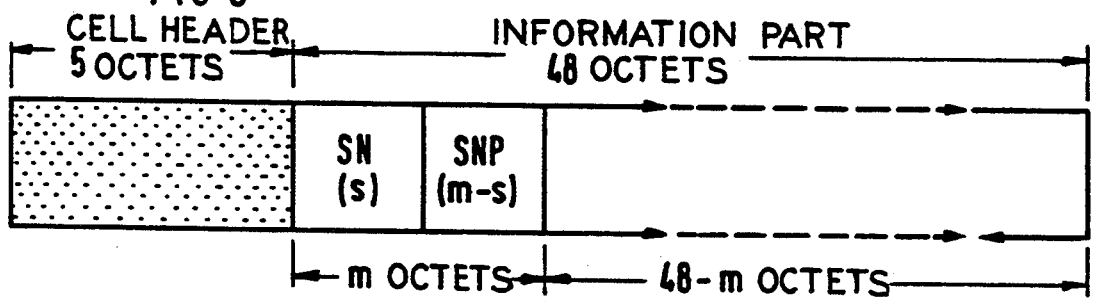

Start signal sections of the continuous bit stream DATin are defined with respect to their bit plurality such that these can be transmitted in the information part of a message cell with respect to a defined plurality of information bits. Such a message cell is schematically shown in FIG. 3. According thereto, such a message cell is composed, for example, of 53 octets, whereby the first five octets form a cell header ("header") in a known way which contains all control signals required for the transmission of the respective message cell via the ATM communication equipment. This cell header is followed by the information part of the message cell composed of 48 octets. In general m octets form the aforementioned information bits. In the exemplary embodiment s octets are for the transmission of a signal section sequence number SN that is yet to be set forth; the remaining octets, i.e. (m-s) octets, by contrast, are provided for the information of a check information SNP for the signal section sequence numbers. The (48-m) octets of the information part, finally, are provided for the acceptance of an aforementioned signal section.

As already mentioned, the message cells respectively containing a signal section are cyclically distributed onto the inputs E1 through Em. The m inputs are thereby respectively involved once in the transmission of a message cell in successive control cycles, whereby the sequence in the present exemplary embodiment is defined in accord with the numbering of the inputs, i.e. the message cells are successively supplied to the inputs E1, E2, . . . ,Em. A uniform signal section sequence number that only periodically continuously changes from control cycle to control cycle, as well as check information are thereby entered into the information part of the message cells to be transmitted, being entered in each of these control cycles. The counting period for these signal section sequence numbers is defined according to the maximum transit time of a message cell through the ATM communication equipment KE. It is shown as an example in FIG. 2 that the uniform signal section sequence number "1" is respectively entered in the information parts of the message cells deposited at the inputs E1 through Em during the course of a control cycle.

Figure 4:
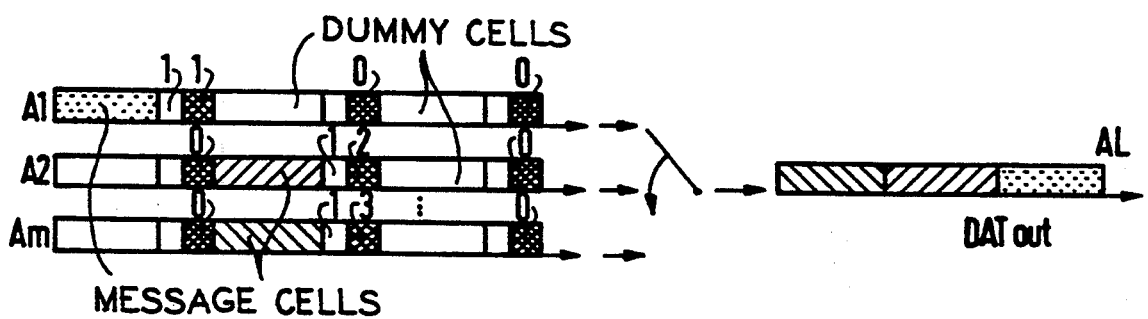

The message cells supplied to the inputs E1 through Em are subsequently transmitted via defined transmission paths within the ATM communication equipment KE. The definition of these transmission paths thereby ensues in such a way that the message cells supplied to the input E1 appear at the output A1, the message cells supplied to the input E2 appear at the output A2, and the message cells supplied to the input Em appear at the output Am. That is, the inputs and outputs referenced with the same sequential number are allocated to one another. As proceeds from FIG. 4, the evaluation means AWE depackets the message cells supplied to it and combines the signal sections contained in these to form a continuous bit stream DATout that corresponds to the continuous bit stream DATin appearing on the offering trunk ZL and that is forwarded via the serving trunk AL. To this end, the signal sections having one and the same signal section sequence number, the signal section sequence number "1" in the illustrated example, are respectively output to the serving trunk AL in a defined sequence in successive control cycles. The sequence thereby corresponds to the sequence with which the message cells containing these signal sections had been previously distributed onto the inputs E1 through Em. That is, the joining of the signal sections to one another during the course of a control cycle begins with the signal section accepted via the output A1 and ends with the signal section accepted via the output Am. Moreover, the aforementioned dummy cells inserted between message cells by the handling means BHE are recognized as such by the evaluation means AWE and are eliminated.

FIG. 5 shows a possible structure of the handling means or interface BHE. A reception register EReg connected to the offering trunk ZL. The reception register EReg is controlled from a control means ST1 such that this reception register EReg provides the respective signal section at its output after the respective reception of a plurality of bits corresponding to a signal section. This output is connected to m reception buffers EP1 through EPm. These reception buffers are periodically repeatedly activated in succession by the control means ST1 in the aforementioned sequence for the acceptance of the signal sections output by the reception register EReg. To this end, these are supplied with corresponding control signals by a decoder DEC1 belonging to the control means. For the acceptance of the signal sections, the reception buffers each respectively contain a memory, for the example in the form of a register. Over and above this, respectively two further registers are provided in each of the reception buffers. In a first register referenced SN-Reg, the control means ST enters a signal section sequence number with appertaining check information, this signal section sequence number being uniform for all reception buffers and merely continuously changing from control cycle to control cycle. The second register referenced HR, by contrast, serves the purpose of storing a defined cell header output proceeding from the control means ST.

The outputs of the registers that have just been recited in each of the reception buffers EP1 through EPm are connected to inputs of a separate multiplexer MUX1. The individual multiplexers are referenced Mx1 through Mxm corresponding to their allocation to the individual reception buffers. A further input of each of the multiplexers is connected to a dummy cell and control signal generator LGEN. Proceeding from this generator, the reception buffers EP1 through EPm and the multiplexers Mx1 through Mxm are controlled such via control lines that message cells according to FIG. 3 are formed corresponding to the measure of the information just now stored in the registers of the reception buffers and are output via the multiplexers to the inputs E1 through Em of the ATM communication equipment KE shown in FIG. 1.

FIG. 6 shows a possible structure of the evaluation means AWE shown in FIG. 1. A message cell acceptance register ES1 through ESm is connected to the outputs A1 through Am. Upon respective reception of a message cell, these registers, under the control of a control signal generator STGEN, forward the signal section contained in this message cell (after checking it with reference to the check information) as well as the appertaining signal section sequence number SN to a separately allocated transmission buffer. The individual transmission buffers are referenced SP1 through SPm in accord with their allocation to the message cell acceptance registers. Each of these transmission buffers has a random access memory RAM having a plurality of memory locations corresponding in number to the aforementioned counting period for the signal section sequence numbers as well as a write address register ARin belonging to it. The random access memory RAM thereby serves the purpose of storing signal sections. The signal section sequence number belonging to a respective signal section is thereby used as memory address for the respective signal section, this signal section sequence number being entered into the write address register ARin.

Over and above this, the transmission buffers SP1 through SPm each respectively has a read address register ARout. An identical read address for the random access memories RAM is respectively entered into the individual read address registers by a control means ST2 in successive control cycles. The read address valid for a control cycle is provided by a counter Z2 that belongs to the control means ST2 and whose counting period corresponds to the counting period for the signal section sequence numbers. The read addresses provided for the successive control cycles, moreover, have a defined offset relative to the signal section sequence numbers that appear in message cells.

The random access memories RAM of the transmission buffers SP1 through SPm respectively provide the signal sections stored under the read address that is provided at the moment. Under the control of a decoder DEC2 belonging to the control means ST2, the individual signal sections that are provided are successively supplied to inputs of a multiplexer Mux2 that outputs the aforementioned, continuous bit stream at its output connected to the serving trunk AL shown in FIG. 1. The enabling of the individual transmission buffers thereby begins with the transmission buffer SP1 and ends with the transmission buffer SPm.

In conclusion, let it also be pointed out that the present invention was in fact set forth above with reference to the example of a single ATM communication equipment (KE). However, the present invention, can also be utilized in an ATM network having a plurality of such ATM communication equipment. In this case, message cells are formed from a continuous bit stream in the aforementioned way in a first ATM communication equipment serving as originating communication equipment and are transmitted over the ATM network via a plurality of transmission paths. The message cells are then in turn combined in the recited way to form a continuous bit stream in an ATM communication equipment that serves as destination communication equipment for the original, continuous bit stream.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for transmitting a continuous bit stream with a first transmission bit rate via an ATM network that operates according to an asynchronous transfer mode, the ATM network having at least one ATM communication equipment with a plurality of inputs and outputs, said inputs and said outputs capable of inputting and outputting, respectively, message cells that have a cell header and an information part and that have a second transmission bit rate that is less than the first transmission bit rate, comprising the steps of:

subdividing the continuous bit stream into successive signal sections whose respective bit plurality of uniformly set, such that for each signal section said respective bit plurality plus a defined plurality of information bits correspond to a plurality of bits that are transmittable as useful signals in the information part of a message cell;

inserting a respective signal section of a plurality of signal sections, corresponding to a bit ratio of the first transmission bit rate to the second transmission bit rate, into a respective information part of a message cell and entering a continuously varying signal section sequence number into said plurality of information bits of the respective information part;

successively distributing message cells appearing during a control cycle onto a plurality of appertaining inputs of the plurality of inputs of the ATM network, the plurality of appertaining inputs corresponding in number to the bit rate ratio, and transmitting the message cells via the appertaining inputs to a plurality of appertaining outputs of the plurality of outputs of the ATM network allocated thereto;

removing from message cells appearing at the appertaining outputs signal sections respectively contained therein as well as respective signal section sequence numbers belonging thereto; and reattaching the individual signal sections to one another to form a further continuous bit stream according to respective signal section sequence numbers.

2. The method according to claim 1, wherein the method further comprises: entering a uniform signal section sequence number that only changes from control cycle to control cycle into said plurality of information bits of the respective information part of respective message cells formed during a control cycle; in the step of successively distributing in a defined sequence onto the appertaining inputs of the ATM network; and joining to one another the signal sections removed from the message cells appearing at the appertaining outputs of the ATM network in a sequence corresponding to the defined sequence and according to the respective signal section sequence numbers into a continuous bit stream.

3. The method according to claim 1, wherein the method further comprises entering check information, serving for a check of a faultless transmission, said plurality of information bits of the respective information part of the message cells in addition to a signal section sequence number.

4. A circuit arrangement for use in transmitting a continuous bit stream with a first transmission bit rate via an ATM network that operates according to an asynchronous transfer mode (ATM), the ATM network having at least one ATM communication equipment with a plurality of internal inputs and internal outputs, said internal inputs and internal outputs capable of inputting and outputting, respectively, message cells that have a cell header and an information part and that have a second transmission bit rate that is less than the first transmission bit rate, the at least one ATM communication equipment being connected to at least one offering trunk via which the continuous bit stream is transmittable with a first transmission bit rate and being connected to at least one serving trunk for the forwarding of the continuous bit stream, comprising:

at least one first interface arrangement connected to a respective offering trunk and connected to a plurality of appertaining internal inputs of the plurality of internal inputs of the ATM network corresponding in number to a bit rate ratio of the first transmission bit rate to the second transmission bit rate;

the first interface arrangement having a distributor connected to the respective offering trunk, said distributor subdividing a received continuous bit stream into successive signal sections each of the signal sections having a respective bit plurality that is uniformly defined such that for each of the signal sections the respective bit plurality plus a defined plurality of information bits correspond to a plurality of bits transmittable in the information part of a message cell as useful signals, said distributor distributing, in successive control cycles, a plurality of signal sections corresponding in number to the bit rate ratio in a defined sequence to packeting devices connected to the appertaining internal inputs of the ATM network;

the packeting devices having means for inserting a signal section, that has just been supplied during a control cycle together with information bits in the form of at least a signal section sequence number, that is uniform for all packeting devices and only varies from control cycle to control cycle, into a message cell and supplying said message cell to an allocated internal input of the ATM network;

at least one second interface arrangement connected to a respective serving trunk and connected to a plurality of appertaining internal outputs of the plurality of internal outputs of the ATM network, said plurality of appertaining internal outputs corresponding in number to the bit rate ratio, the plurality of internal outputs being allocated to the plurality of internal inputs;

the second interface arrangement having depacketing devices that are connected to the internal outputs, a respective depacketing device removing the signal section contained in the message cells appearing at the appertaining internal output and removing the signal section sequence number from the message cells appearing at the appertaining internal output, each depacketing device having a random access memory in which a respective signal section is intermediately stored under a write address corresponding to the signal section sequence number;

the random access memories that belong to the depacketing devices being respectively driven in successive control cycles according to a uniform read address that only changes from control cycle to control cycle such that these random access memories successively provide a respective signal section just now stored under the read address in a sequence corresponding to a defined sequence; and a multiplexer joining signal sections, provided by the random access memories, with one another to form a further continuous bit stream, said multiplexer connected following the depacketing devices and connected to a respective serving trunk.

5. A method for transmitting a continuous bit stream with a first transmission bit rate via an ATM network that operates according to an asynchronous transfer mode ATM, the ATM network having at least one ATM communication equipment with a plurality of inputs and outputs, said inputs and said outputs capable of inputting and outputting, respectively, message cells that have a cell header and an information part and that have a second transmission bit rate that is less than the first transmission bit rate, comprising the steps of:

subdividing the continuous bit stream into successive signal sections whose respective bit plurality is uniformly set, such that for each signal section said respective bit plurality plus a defined plurality of information bits correspond to a plurality of bits that are transmittable as useful signals in the information part of a message cell;

inserting during a control cycle respective signal section of a plurality of signal sections, corresponding to a bit ratio of the first transmission bit rate to the second transmission bit rate, into respective information parts of message cells and entering a uniform signal section sequence number that only changes from control cycle to control cycle into said plurality of information bits of the respective information parts;

successively distributing message cells appearing during a control cycle onto a plurality of appertaining inputs of the plurality of inputs of the ATM network in a predefined sequence, the plurality of appertaining inputs corresponding in number to the appertaining bit rate ratio, and transmitting the message cells via the appertaining inputs to a plurality of appertaining outputs of the plurality of outputs of the ATM network allocated thereto;

removing from message cells appearing at the appertaining outputs signal sections respectively contained therein as well as respective signal section sequence numbers belonging thereto; and joining to one another the signal sections removed from the message cells appearing at the appertaining outputs of the ATM network in a sequence corresponding to the predefined sequence and according to the respective signal sequence numbers into a continuous bit stream.

6. The method according to claim 5, wherein the method further comprises entering check information, serving for a check of a faultless transmission, into said plurality of information bits of the respective information part of the message cells in addition to a signal section sequence number.

* * * * *